Sept. 30, 1952  I. P. W. NORD  2,612,123
UNITARY COOKY CUTTER
Filed Aug. 14, 1947  3 Sheets-Sheet 1
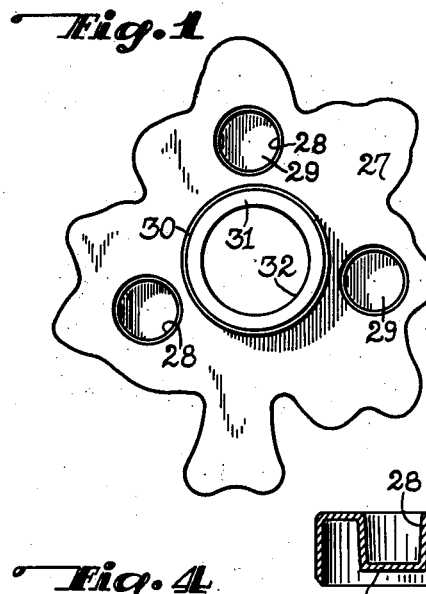
Fig. 1
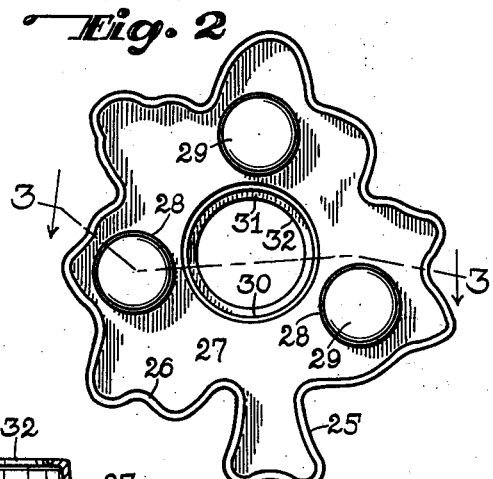
Fig. 2
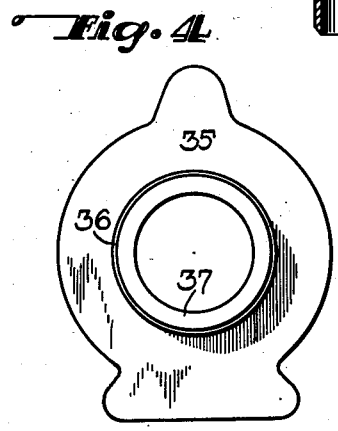
Fig. 4
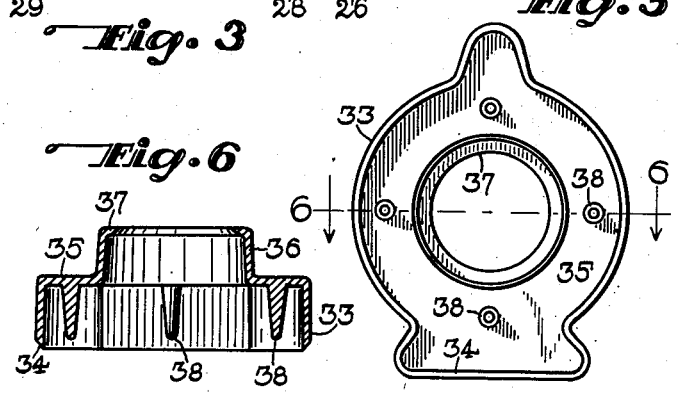
Fig. 3
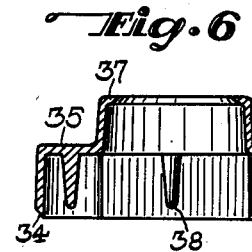
Fig. 6
Fig. 5
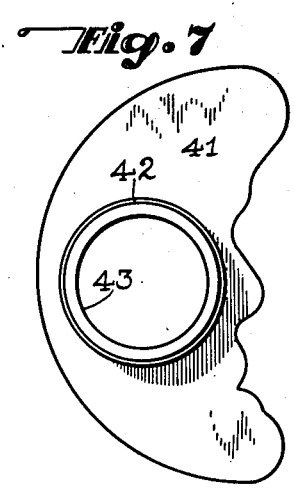
Fig. 7
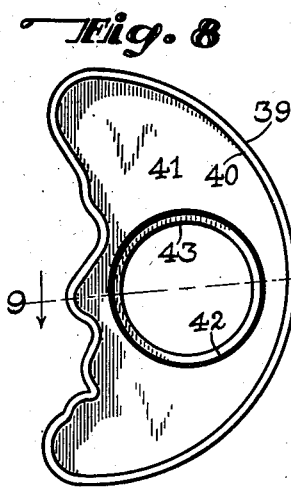
Fig. 8
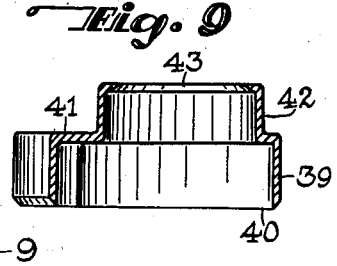
Fig. 9
INVENTOR:
IDA PEARL W. NORD
BY C. F. Wm Forssberg
ATTORNEY.

Sept. 30, 1952     I. P. W. NORD     2,612,123
UNITARY COOKY CUTTER
Filed Aug. 14, 1947     3 Sheets-Sheet 2
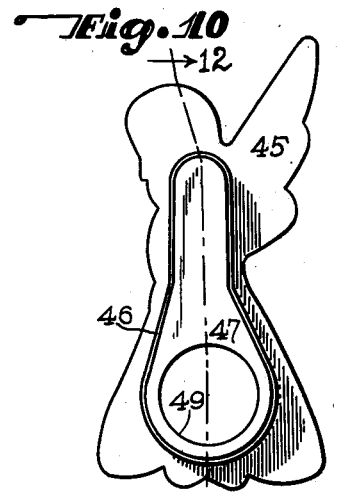
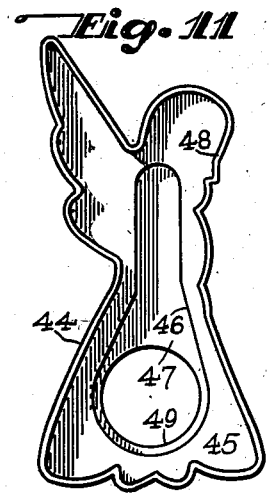
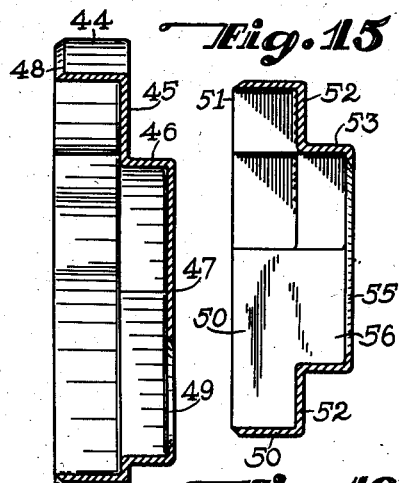
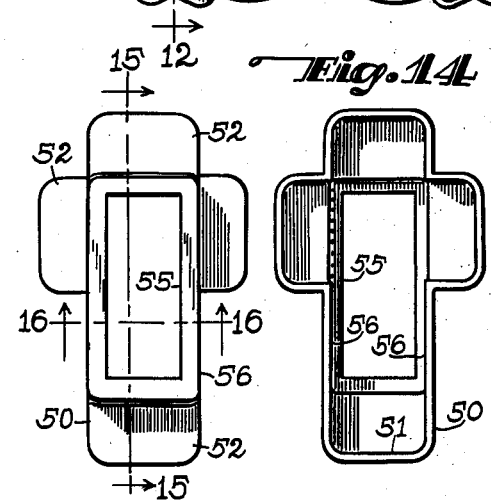
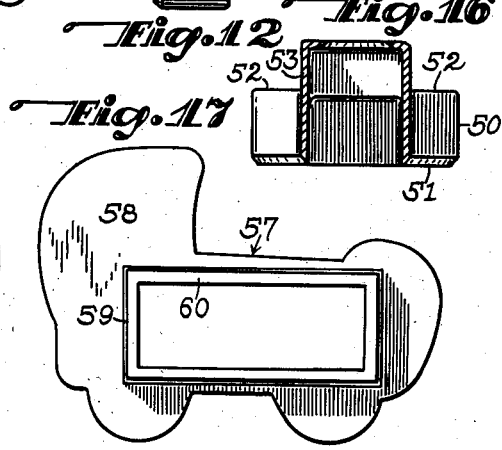
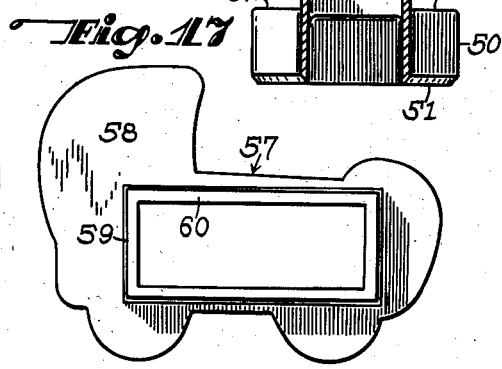
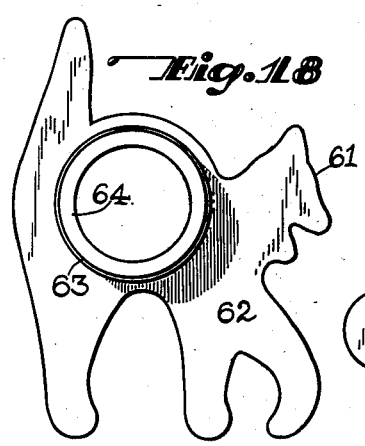
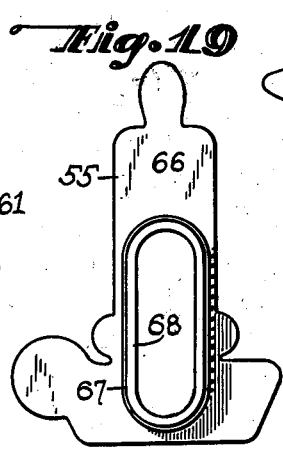
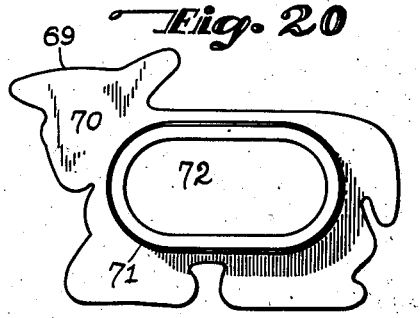
INVENTOR:
IDA PEARL W. NORD
BY C. F. Wm. Forssberg
ATTORNEY.

Sept. 30, 1952     I. P. W. NORD     2,612,123
UNITARY COOKY CUTTER

Filed Aug. 14, 1947     3 Sheets-Sheet 3

INVENTOR:
IDA PEARL W. NORD
BY C. F. Wm Forssberg
ATTORNEY.

Patented Sept. 30, 1952

2,612,123

UNITED STATES PATENT OFFICE 2,612,123

UNITARY COOKY CUTTER

Ida Pearl W. Nord, Springfield, Mass.

Application August 14, 1947, Serial No. 768,681

4 Claims. (Cl. 107—47)

The present invention relates to cookie cutters and the like which are made of cast metal or plastics, and particularly the type in which the cutters are unitary or made in one piece.

The main object of my invention is to provide a type of cookie cutter which is integral and has an endless cutting edge formed into any one of a plurality of profile designs.

Another object is to provide a cookie cutter made unitary of plastic which has a handle or grip portion surmounting the portion forming the cutting edge.

A further object is to provide such a cookie cutter which has the handle or grip portion integral with the cutting portion and made smaller than the same in cross section.

It is also an object of this invention to produce a cookie cutter which has a top over the cutting edge portion connected directly to the handle portion and opening into the latter, while the handle portion is at least partly open at the top to provide ventilation to the interior of the cutter and prevent air lock within the same.

It is even an object to provide the cutters with handle or grip portions which differ in size and shape but substantially always of lesser cross section than that of the cutting edge portion of the cutter involved.

It should likewise be noted that a further object is to include in the construction of an integral plastic cookie cutter either hollow or solid integral internal projections disposed in effective positions to indent the cookies to be made by the cookie cutters thus provided.

An ancillary object is to have cookie cutters which are very light and proof against rust and such deterioration.

Other objects and advantages of the invention will appear more fully in detail as this specification proceeds.

In order to bring out to best advantage the features of this invention, several practical embodiments thereof are illustrated in the accompanying drawings forming part hereof, and in which:

Figure 1 is a plan view or elevation of one form of cookie cutter made according to my invention and displaying the salient features thereof;

Figure 2 is a rear view of the same cookie cutter;

Figure 3 is a transverse section of the same cutter as taken on line 3—3 in Figure 2;

Figure 4 is a front view or elevation of another form of cookie cutter embodying substantially the same principles as that of Figures 1, 2 and 3;

Figure 5 is a rear view of the cutter of Figure 4;

Figure 6 is a transverse section of the cookie cutter of Figure 5 as taken on line 6—6;

Figure 7 is a front elevation of a third form of cookie cutter also embodying the main principles of the invention;

Figure 8 is a rear elevation of the mentioned third form of cookie cutter;

Figure 9 is a transverse section of the cutter shown in Figure 8 as taken on line 9—9;

Figure 10 is a front elevation of a fourth form of cutter embodying the main principles of the invention;

Figure 11 is a rear elevation of the same fourth form of cookie cutter;

Figure 12 is a vertical section of the cutter as taken on line 12—12 in Figure 10;

Figure 13 is a front elevation of a fifth form of the cookie cutter;

Figure 14 is a rear elevation of the cutter of Figure 13;

Figure 15 is a vertical section of the cookie cutter of Figure 13 as taken on line 15—15;

Figure 16 is another or transverse section of the same cutter as taken on line 16—16 in Figure 13;

Figure 17 is a front elevation of a sixth form of cookie cutter embodying the invention;

Figure 18 is a front elevation of a seventh form of cookie cutter made according to the invention;

Figure 19 is a front elevation of an eighth form of cookie cutter embodying the features of the invention;

Figure 20 is a front elevation of a ninth form of cookie cutter made according to the principles of the invention;

Throughout the views, the same reference numerals indicate the same or like parts.

Figure 21:
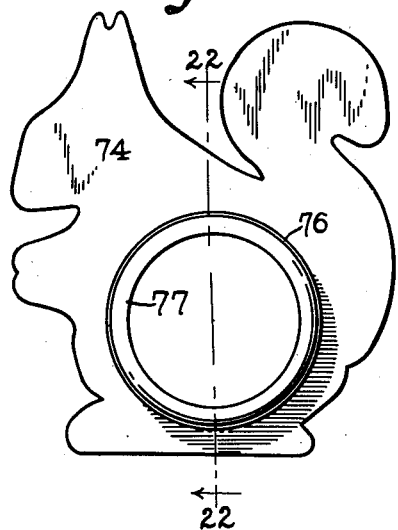
Figure 21 is a front elevation of a cookie cutter made according to the features of the invention; the tenth in the series.

In cookie cutters, metal has usually been used for making cookie cutters, and especially sheet metal, the same being stamped or formed to provide the cutting edges and frequently some form of grip or handle has been added whereby to hold the cutter involved. Certain limitations and disadvantages were, of course inherent in such sheet metal cutters, the manufacture being an item of expense making the cutters cost more than should be necessary, while the metal, being usually steel, would tend to rust. Other disadvantages were also that the fact that these cutters were largely the product of hand work in manufacture would naturally cause them to lack uniformity, or if made by dies would be rough on the edges and endanger the hands of the user, and that all too often such cutters were in final analysis only makeshifts with which the housewife would have to get along as best she could and have to acquire skill to use for satisfactory results.

Now, I have found it possible to simplify manufacture of many useful forms of cookie cutters by first making them of plastic, and including the features of providing a grip or handle portion in one piece with the cutting edge portion and so placing and forming said grip portion that it is accessible and of such form as to facilitate use of the cutter thus made.

Hence, in the practice of my invention, and referring again to the accompanying drawings, a cookie cutter shown in Figures 1, 2 and 3 serves to cut cookies like a leaf or cherry tree and primarily includes the endless cutting edge wall 25 beveled to form a cutting edge 26 and surmounted by a flat top 27 forming a backing, as it were for the endless wall 25. From the flat top 27 a group of projections 28, 28 extend down a limited distance into the interior of the cutter, each being hollow and having a bottom wall 29 sufficiently raised from the level of the cutting edge 26 to cause the projection merely to indent the cookie to a limited extent when being cut.

In order to hold the cutter in a convenient manner, the top 27 has a raised wall portion 30 forming a grip for the fingers, this wall portion being hollow and constituting an integral continuation of the cutter top. The mentioned grip or wall portion also has a top 31 which is a mere flange in order to provide ample ventilation opening for preventing the air within the cookie cutter from becoming partly compressed when cutting a cookie and perhaps thereby preventing the latter from being formed properly, as there must obviously be no resistance present due to such air pressure. The opening 32 is not only ample for the mentioned purpose, but preferably large enough to allow the tip of the finger to be passed through it to disengage any cookie that tends to stick in the cutter, if such an eventuality occurs, and the opening may also serve to allow the cutter to be hung up on a hook or rod, if desired. In any event, the cutting edge wall 25, top 27, projections 28 with their bottoms 29, hand grip wall 30 and its top wall or flange 31 are all integral and the cutter thus a unitary article molded in a die in well known manner. Any known plastic may be used, or any combination that suits the manufacturer, cellulose derivatives, phenol condensation derivatives, styrene type or other plastics being suggested.

In Figures 4, 5 and 6 another shape of cutter is shown, suggesting a clock or the like, the bounding or cutting wall 33 having the beveled cutting edge 34 and top 35 surmounted by hand grip wall 36 with its open top 37. However, in this form, a group of solid projections 38, 38 extend integrally from the top down into the space within the cutter and terminate a short distance above the cutting edge 34 in order to indent the cookies while being made, with small round holes instead of the large, flat depressions produced by the hollow projections 28 of the first form of cutter of Figures 1, 2 and 3. In this case, also, the cutting edge wall, top, handle or grip portion and its top as well as the solid projections depending from the top 35 are all integral and a unitary plastic casting.

The moon shaped cutter of Figures 7, 8 and 9 includes a bounding or cutting edge wall 39 having the beveled cutting edge 40 and top 41 surmounted by hand grip portion or wall 42 provided with the open top 43, all these parts being integral and of plastic. No internal projections are present in this cutter, either hollow or solid.

In the cookie cutter illustrated in Figures 10, 11 and 12, the cookie is intended to be cut in the form of an angel, this cutter being provided with the bounding cutting wall 44, generally flat top 45, upwardly projecting handle wall portion 46 and somewhat extensive handle top 47, the bounding wall having the usual beveled cutting edge 48, and the whole cutter being a unitary plastic article, while the top is, of course vented by opening 49.

In the four views of Figures 13, 14, 15 and 16, a cross shaped cookie cutter appears, which has the bounding wall 50 beveled at 51 to form the cutting edge and the rather isolated top portions 52, 52, 52, etc., and the handle portion 53 with the top 54 having a rectangular form and oblong opening 55, portions of bounding wall 50 at the sides being similar in width and substantially direct continuations of the sides 56, 56 of the upper handle portion or wall 53.

Figure 17 shows a baby carriage cookie cutter 57, its bounding cutting edge wall being concealed beneath its top 58, while an oblong handle portion 59 has an oblong open top 60.

The cat shaped cookie cutter of Figure 18 noted at 61 has the top 62 thereof concealing the cutting edge as well as the actual bounding wall, but is surmounted by the round handle portion 63 with its open top 64. In similar fashion, the cookie cutter 65 of Figure 19, adapted to cut cookies shaped like a candle holder, has the top 66 thereof surmounted by vertically elongated handle portion 67 with the open top 68, the lower bounding wall and cutting edge being concealed by said top 66.

The cookie cutter 69 in Figure 20 is intended to cut cookies shaped like a sheep, the flat top 70 concealing the bounding wall and cutting edge naturally forming part of the cutter. The upper hand grip portion 71 has the open top 72, this hand grip portion being horizontally disposed in contrast with the vertical arrangement found in Figure 10 but also being elongated.

Figure 22:
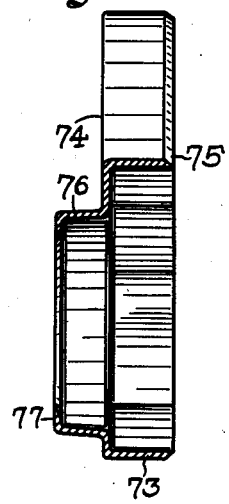
Figure 22 is a vertical section of the cookie cutter shown in Figure 21 as taken on line 22—22.
Figure 23:
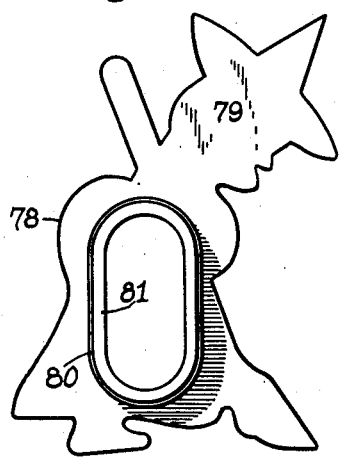
Figure 23 is also a front elevation of a further form of cutter made according to the invention, being the eleventh in the series.

The squirrel shaped cookie cutter disclosed in Figures 21 and 22 has the usual bounding cutting wall 73 capped by the flat top 74 and beveled at its free edges to form cutting edge 75. The top is surmounted by the integral round hand grip portion 76 having the open top 77. The cookie cutter 78 shown in Figure 23 serves to cut witch shaped cookies and its flat top 79 conceals the bounding cutting wall of the cutter and has the upper integral hand grip portion 80 similar to portion 67 of the cutter 65 in Figure 19, being provided with the open top 81 to finish its form.

Figure 24:
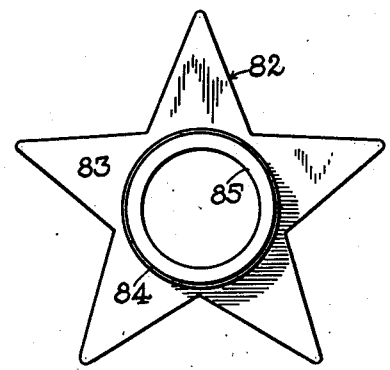
Figure 24 is likewise a front elevation of a twelfth form of cookie cutter embodying the main principles of the invention.

Finally, the star shaped cookie cutter of Figure 24 designated at 82 as usual conceals the bounding cutting wall beneath the same, being shown in only one view mainly revealing the flat top 83 upon which is located the round hand grip portion 84 with its open top 85.

In all of the forms set forth hereabove, the same general principles prevail, as all are integral and cast or formed of a single piece of plastic or even sheet metal, if desired. The wall thickness may be anywhere from one sixty-fourth to one sixteenth of an inch or more, and the bounding cutting wall is preferably beveled upon the outside, or it may itself be wedge shaped. When made of sheet metal, the cutters will obviously be pressed or stamped in one piece, but I have found that plastic serves admirably for making them light and inexpensive, not to mention that many attractive colors of plastics may be used to enhance the appearance and sales appeal of the cutters. The various forms shown do not represent the only forms possible and I therefore reserve the right to add as many novel shapes to the series illustrated as I see fit, but in all cases, the principles of the invention still hold as before indicated.

Manifestly, modifications and further variations may be resorted to, and parts and features may be modified or used without others within the scope of the appended claims.

Having now fully described my invention, I claim:

1. A unitary cookie cutter including an endless bounding cutting wall having a profile of a predetermined design, a substantially flat top integral with the mentioned bounding cutting wall, an endless hand grip wall portion of relatively smaller extent than that of the first mentioned bounding cutting wall portion projecting integrally upward from said top and having a profile of a different design than that of said first mentioned bounding cutting wall, and an integral top portion upon the hand grip wall portion having an open area within the outline thereof and consisting of an inwardly projecting endless flange upon said hand grip wall portion defining the open area and allowing entry of a finger from above into said hand grip wall portion to release a cookie from said cookie cutter.

2. A cookie cutter according to claim 1, wherein the hand grip wall portion has portions thereof forming direct unbroken continuations of portions of the first mentioned bounding cutting wall.

3. A unitary cookie cutter according to claim 1, wherein the mentioned bounding cutting wall has the profile of a cross.

4. A unitary cookie cutter including an endless bounding cutting wall having a profile of a predetermined design, a substantially flat top integral with the mentioned bounding cutting wall and having a plurality of integral hollow projections of limited depth extending down from said top into the interior of the cutter, an endless hand grip wall portion of relatively smaller extent than that of the first mentioned bounding cutting wall portion projecting integrally upward from said top and having a profile of a different design than that of said first mentioned bounding cutting wall, and an integral top portion upon the hand grip wall portion having an open area within the outline thereof and consisting of an inwardly projecting endless flange upon the hand grip portion defining the open area and allowing entry of a finger from above into said hand grip wall portion to release a cookie from said cookie cutter.

IDA PEARL W. NORD.

REFERENCES CITED

The following references are of record in the file of this patent:

UNITED STATES PATENTS

| Number | Name | Date |
|---|---|---|
| 65,618 | Treadwell | June 11, 1867 |
| 435,448 | Prahm | Sept. 2, 1890 |
| 1,031,243 | Carnes | July 2, 1912 |
| 1,297,900 | Patton | Mar. 18, 1919 |
| 1,618,685 | Stauffer | Feb. 22, 1927 |
| 2,008,725 | Parker | July 23, 1935 |
| 2,228,335 | Allen | Jan. 14, 1941 |
| 2,379,140 | Frank | June 26, 1945 |